(12) United States Patent
D'Antonio

(10) Patent No.: US 8,069,756 B2
(45) Date of Patent: Dec. 6, 2011

(54) APPARATUS FOR AUTOMATICALLY DETECTING THE POSITION OF THE CUTTING TOOL IN THE COMPUTERIZED NUMERICALLY CONTROLLED LATHE

(75) Inventor: Mario D'Antonio, Shanghai (CN)

(73) Assignee: Marposs Societa' per Azioni, Bentivoglio (IT)

( * ) Notice: Subject to any disclaimer, the term of this patent is extended or adjusted under 35 U.S.C. 154(b) by 421 days.

(21) Appl. No.: 11/596,800

(22) PCT Filed: May 21, 2004

(86) PCT No.: PCT/KR2004/001212
§ 371 (c)(1),
(2), (4) Date: Nov. 17, 2006

(87) PCT Pub. No.: WO2005/113180
PCT Pub. Date: Dec. 1, 2005

(65) Prior Publication Data
US 2007/0221020 A1    Sep. 27, 2007

Related U.S. Application Data

(63) Continuation-in-part of application No. 10/536,391, filed as application No. PCT/KR03/02612 on Nov. 29, 2003.

(30) Foreign Application Priority Data

Nov. 29, 2002 (KR) ............. 10-2002-0075099

(51) Int. Cl.
*B23Q 15/22* (2006.01)
*B23Q 17/22* (2006.01)

(52) U.S. Cl. ............ 82/152; 82/118; 408/13

(58) Field of Classification Search ............ 82/132–139, 82/152–156; 408/9, 10, 13; 409/220, 194
See application file for complete search history.

(56) References Cited

U.S. PATENT DOCUMENTS

| | | | | |
|---|---|---|---|---|
| 3,492,894 A * | 2/1970 | Hahn et. al. | ............... | 408/13 |
| 3,590,673 A * | 7/1971 | Foll et al. | ............... | 82/11 |
| 3,740,160 A * | 6/1973 | Kimura et al. | ............... | 408/2 |
| 3,749,508 A * | 7/1973 | Schukrafft | ............... | 408/156 |
| 4,055,386 A | 10/1977 | Chynoweth et al. | | |
| 4,204,782 A | 5/1980 | Spits et al. | | |
| 4,335,498 A | 6/1982 | Hague et al. | | |
| 4,425,061 A * | 1/1984 | Kindl et al. | ............... | 408/16 |
| 4,552,493 A | 11/1985 | Schultshick | | |

(Continued)

FOREIGN PATENT DOCUMENTS

DE    297 22 951 U1    4/1996

(Continued)

*Primary Examiner* — Boyer D Ashley
*Assistant Examiner* — Sara Addisu
(74) *Attorney, Agent, or Firm* — Dickstein Shapiro LLP

(57) ABSTRACT

Disclosed is an apparatus for automatically detecting the position of a cutting tool in a computerized numerically controlled lathe which is capable of preventing over-load operation of a driving motor by allowing an arm having a touch sensor mounted thereto to safely stop at a position while the driving motor stops operating. The touch sensor is pivoted by means of a gear assembly driven by the driving motor. When the arm is rotated and reaches a proper position, a worm and a worm wheel of the gear assembly are rotated until a camshaft is brought into contact with a stopper. The arm is moved toward the cutting tool and the cutting tool is brought into contact with the touch sensor in accordance with a program that is preprogramedly input into the computerized numerically controlled lathe.

7 Claims, 10 Drawing Sheets

U.S. PATENT DOCUMENTS

| | | | |
|---|---|---|---|
| 4,662,120 A * | 5/1987 | Imai et al. | 451/239 |
| 4,784,541 A | 11/1988 | Umehara et al. | |
| 4,902,175 A | 2/1990 | Faulstich et al. | |
| 5,066,176 A * | 11/1991 | Johnstone | 409/133 |
| 5,127,778 A * | 7/1992 | Scheer | 409/132 |
| 5,609,077 A * | 3/1997 | Ohmi et al. | 81/57.13 |
| 5,795,114 A * | 8/1998 | Schweizer et al. | 409/233 |
| 6,060,855 A * | 5/2000 | Matsuhashi | 318/652 |
| 6,090,026 A | 7/2000 | Hosokawa et al. | |
| 6,481,939 B1 * | 11/2002 | Gillespie et al. | 409/131 |
| 6,615,697 B2 | 9/2003 | Nakagawa | |
| 2006/0037443 A1* | 2/2006 | D'Antonio | 82/159 |
| 2007/0221020 A1 | 9/2007 | D'Antonio | |

FOREIGN PATENT DOCUMENTS

| | | |
|---|---|---|
| DE | 29722951 U1 * | 2/1998 |
| DE | 297 22 951 U 1 | 4/1998 |
| FR | 2 600 002 A1 | 12/1987 |
| FR | 2 600 002 A1 | 12/1987 |
| FR | 2600002 A * | 12/1987 |
| JP | 64-55359 | 4/1989 |
| JP | 1-150826 | 6/1989 |
| JP | 01150826 A * | 6/1989 |
| JP | 05-162002 | 6/1993 |
| JP | 07-124849 | 5/1995 |
| JP | 10-309652 | 11/1998 |
| JP | 10309652 A * | 11/1998 |
| JP | 11-188572 | 7/1999 |
| JP | 4202322 | 10/2008 |
| KR | 2004043012 A * | 11/2002 |
| KR | 2005023157 A * | 3/2005 |
| KR | 761196 B1 * | 9/2007 |
| KR | 790775 B1 * | 1/2008 |

* cited by examiner

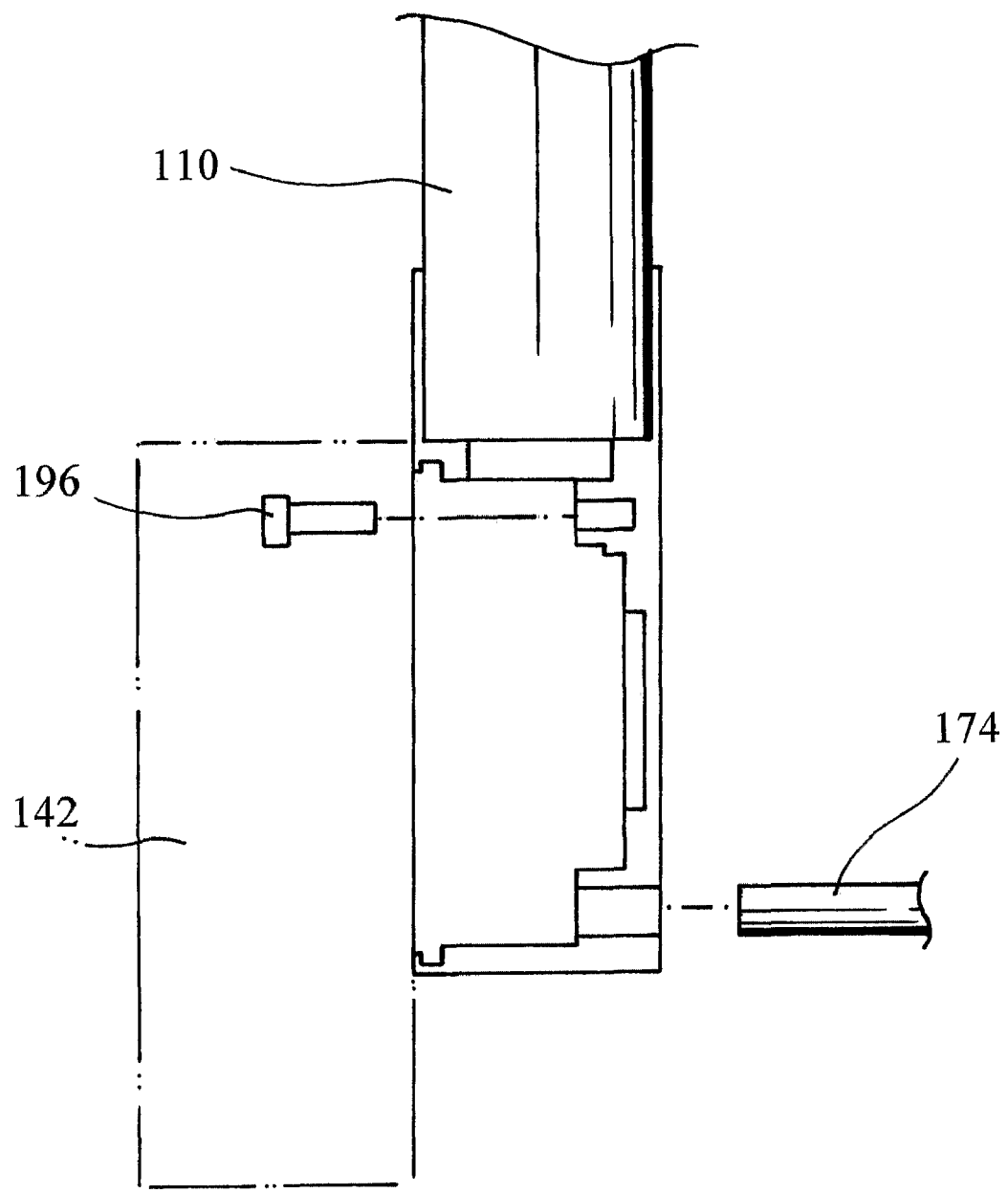

100

APPARATUS FOR AUTOMATICALLY DETECTING THE POSITION OF THE CUTTING TOOL IN THE COMPUTERIZED NUMERICALLY CONTROLLED LATHE

This application is a continuation-in-part of U.S. national stage application Ser. No. 10/536,391, having a §371 date of May 26, 2005, which is based on PCT/KR2003/002612, filed Nov. 29, 2003.

TECHNICAL FIELD

The present invention relates to an apparatus for automatically detecting the position of the cutting tool in the computerized numerically controlled lathe, more particularly to an apparatus for automatically detecting the position of the cutting tool in the computerized numerically controlled lathe which is capable of preventing over-load operation of a driving motor by allowing an arm having a touch sensor mounted thereto to be safely stop at a position of detecting the cutting tool while the driving motor provided within a main body of a housing stops operating.

BACKGROUND ART

Generally, the computerized numerically controlled lathe automatically processes a work piece by using a computer on a basis of a pre-programmed process condition such as a target processing measurement, a desired shape, a transferring speed of the cutting tool, etc. Since this lathe is profitable to the factory automation and the mass production, it has been widely used in various applications.

FIG. 1 shows the conventional computerized numerically controlled lathe 10.

Referring to FIG. 1, the computerized numerically controlled lathe 10 comprises a frame 12 including a bed 12a, a headstock 14 for grasping and fixing one end of the work piece, which is fixed at one side of the frame 12, a tailstock 16 for grasping and fixing the other end of the work piece, which is sliderably positioned on the bed 12a in opposite to the headstock 14, a tool rest 18 for processing the work piece rotated between the headstock 14 and the tailstock 16 while moving along the longitudinal axis of the bed 12a on one side portion of the bed 12a of the frame 12, a control part (not shown) for controlling the headstock 14, the tailstock 16 and the tool rest 18.

The work piece, which is supported and rotated between the headstock 14 and the tailstock 16, is automatically processed by the cutting tool mounted to the tool rest 18 sliding on the bed 12a on a basis of the pre-programmed process condition.

However, problems with the conventional computerized numerically controlled lathe as described above are that a cutting edge of the cutting tool for processing the work piece may be worn due to the friction between the cutting edge and the work piece and the processing precision of the cutting tool may deteriorate due to the change of the cutting tool's position. Another problem which is inherent to such known computerized numerically controlled lathe is that, when the old cutting tool has been changed with a new cutting tool, it is extremely difficult to obtain an accurate treatment of the work piece due to the difference of positions between the old cutting tool and the new cutting tool.

A variety of endeavors for solving these problems have been proposed. One approach, a program for compensating the cutting tool's position so as to compensate a positional deviation between the coordinates of the cutting tool for processing the work piece and the standard coordinates in order to enhance the processing accuracy of the cutting tool during operation of processing the work piece, has been proposed.

This program is preprogramedly input into the computerized numerically controlled lathe 10.

FIG. 2 shows the apparatus for detecting a position of the cutting tool mounted to the computerized numerically controlled lathe, more particularly shows the apparatus for detecting the position of the cutting tool mounted to the headstock of the computerized numerically controlled lathe.

As shown in FIG. 2, the apparatus 20 for detecting the position of the cutting tool comprises an arm 22 having a touch sensor 22a for sensing the position of the cutting tool, a gear assembly 24 for pivoting the arm 22 toward the cutting tool, and a driving motor (not shown) for driving the gear assembly 24.

At the apparatus 20 for detecting the position of the cutting tool, the arm 22 having the touch sensor 22a is moved toward the cutting tool by means of the gear assembly 24 and then the cutting tool is brought into contact with the touch sensor 22a in accordance with the program that is preprogramedly input into the computerized numerically controlled lathe 10. At this time, the touch sensor 22a provides the control part of the computerized numerically controlled lathe with a sensing signal.

As soon as the sensing signal is input into the control part from the apparatus 20 for detecting the position of the cutting tool, the control part of the computerized numerically controlled lathe recognizes the position of the cutting tool. Then, the control part compares the detected value relative to the position of the cutting tool with a standard value and then calculates a displacement of the cutting tool. Finally, the control part provides the tool rest with the control signal for compensating the position of the cutting tool based on the displacement of the cutting tool calculated.

Accordingly, it is possible to compensate the position of the cutting tool such that the front end's position of the cutting tool corresponds to the initial state of the cutting tool, which is preprogramedly set into the computer.

However, one problem with the apparatus for detecting the position of the cutting tool as described above is that the arm having the touch sensor must be maintained at a sensing position until the cutting tool is brought into contact with the touch sensor after moving the touch sensor to the sensing position so as to minutely compensate the position of the cutting tool. Accordingly, the driving motor must be continuously operated and thereby it may be damaged when an over load occurs in the driving motor.

DISCLOSURE OF INVENTION

Therefore, the present invention has been developed to solve the above-mentioned problems. It is an object of the present invention to provide an apparatus for detecting a position of a cutting tool which is capable of preventing over-load operation of a driving motor by allowing an arm having a touch sensor mounted thereto to be safely stop at a position of detecting the cutting tool while the driving motor provided within a main body of a housing stops operating.

In order to accomplish the above object, the present invention provides an apparatus for automatically detecting the position of the cutting tool in the computerized numerically controlled lathe, the apparatus comprising:

a touch sensor for sensing the position of the cutting tool in the computerized numerically controlled lathe;

an arm for moving the touch sensor to a predetermined position for sensing the position of the cutting tool, the arm being provided with a sensing dog, which protrudes from one side surface of the arm at a predetermined length;

a gear assembly for pivoting the arm in a range of predetermined rotational angles, the gear assembly being combined to the arm;

a driving motor for supplying the gear assembly with a driving force; and a housing for accommodating the gear assembly and the driving motor, in which a bearing housing is fixedly mounted to one side of a main body of the housing, a stopper is fixedly mounted to an exposed surface of the bearing housing, first and second sensors for sensing the access state of the arm during rotation of the arm are installed at one surface of the housing.

The gear assembly includes an idle gear that is engaged with a spur gear mounted to the driving motor, a worm wheel for pivoting the arm by engaging with the arm, a worm for rotating the worm wheel, and a worm shaft having a spur gear at its one end, in which the worm is sliderably mounted to the worm shaft.

The worm shaft is provided with a staged portion, which is formed at a position spaced from the one end of the worm shaft toward the other end thereof at a predetermined distance, in which a flange is formed at the other end of the worm shaft.

The worm is sliderably mounted between the staged portion and the flange of the worm shaft, in which an elastic member for elastically supporting the worm is disposed between the worm and the flange of the worm shaft so as to restrain the slide movement of the worm.

The touch sensor is mounted to a distal end of the arm, a camshaft is fixedly installed at a radial outer circumferential surface of the arm.

The main body of the housing is fixed to one side of the headstock of the computerized numerically controlled lathe.

The worm and the worm wheel engaged with the worm are rotated together until the camshaft of the arm is contacted with the stopper and then the arm reaches a predetermined sensing position.

When the arm rotates and thereby it reaches the predetermined sensing position, the cutting tool begins to be moved on a basis of the pre-programmed process condition and then it is contacted with the touch sensor, whereby the touch sensor generates a sensing signal and then it supplies the control part of the computerized numerically controlled lathe with the sensing signal.

If the camshaft provided at the arm reaches to the stopper, the worm wheel couldn't be further rotated and stops rotating. Under this state, if the driving motor operates for a predetermined time, the worm shaft continuously rotates. At this time, the worm engaged with the worm wheel stopped is rotated and moved in the axial direction of the worm shaft. As a result, the other end of the worm is spaced from the staged portion of the worm shaft at a predetermined distance and thereby compressing the elastic member.

If the driving motor stops operating, the elastic force of the elastic member begins to be applied to the worm. At this time, a force may be applied to the worm wheel engaged with the worm in the clockwise direction. Although the driving motor stops operating, the camshaft of the rotating arm is continuously contacted with the stopper and thereby the touch sensor provided at the arm is fixed at the sensing position.

As described above, according to the present invention, the arm, which has been reached at the sensing position in order to sense the front distal end of the cutting tool mounted to the tool rest in the computerized numerically controlled lathe, can be fixed at the sensing position due to the operation of the elastic member disposed between the worm and the flange of the worm shaft while the driving motor stops operating.

Accordingly, it is possible to effectively prevent over-load operation of the driving motor and to prevent the driving motor from being damaged due to the over load. Thereby, the durability of the apparatus for automatically detecting the position of the cutting tool can be highly enhanced.

BRIEF DESCRIPTION OF DRAWINGS

The above objects and other characteristics and advantages of the present invention will become more apparent by describing in detail a preferred embodiment thereof with reference to the attached drawings, in which:

FIG. 3A and 3B diagrammatically show a partial constitution of an apparatus for detecting the position of the cutting tool mounted to the computerized numerically controlled according to the present invention;

BEST MODE FOR CARRYING OUT THE INVENTION

Embodiments

Hereinafter, the apparatus for automatically detecting the position of the cutting tool in the computerized numerically controlled lathe according to the preferred embodiment of the present invention will be described in detail with reference to the accompanying drawings.

Figure 3A:
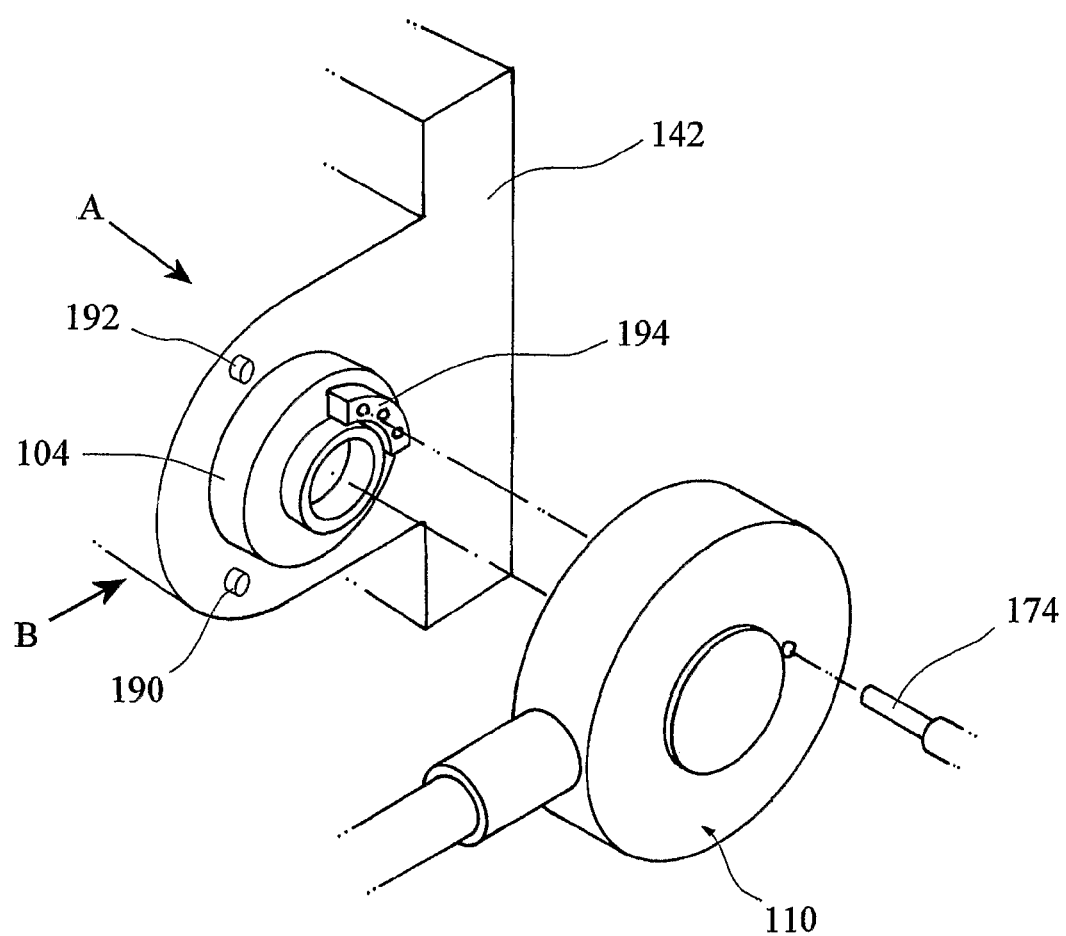
Figure 4A:
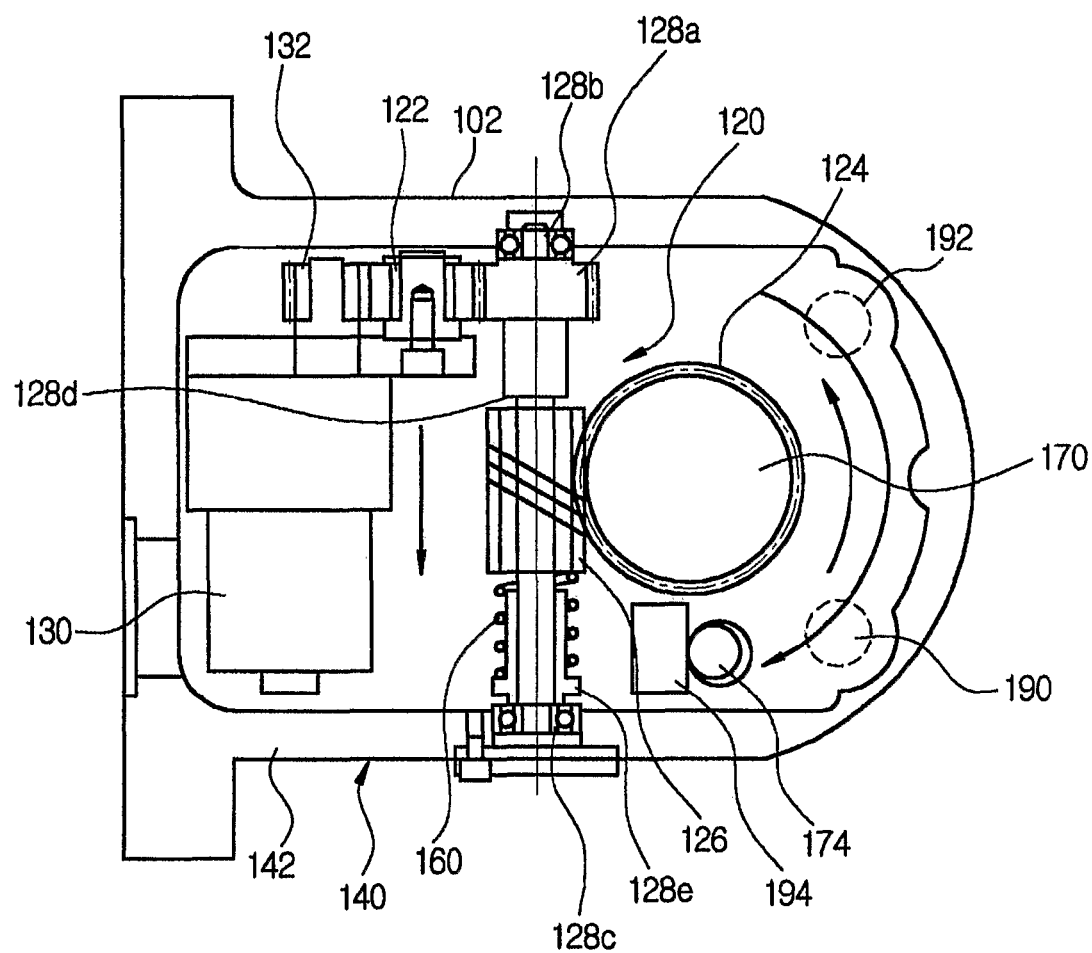
FIG. 4A is a view indicated by the arrow "A" in FIG. 3A, showing an internal constitution of the apparatus for detecting the position of the cutting tool.
Figure 4B:
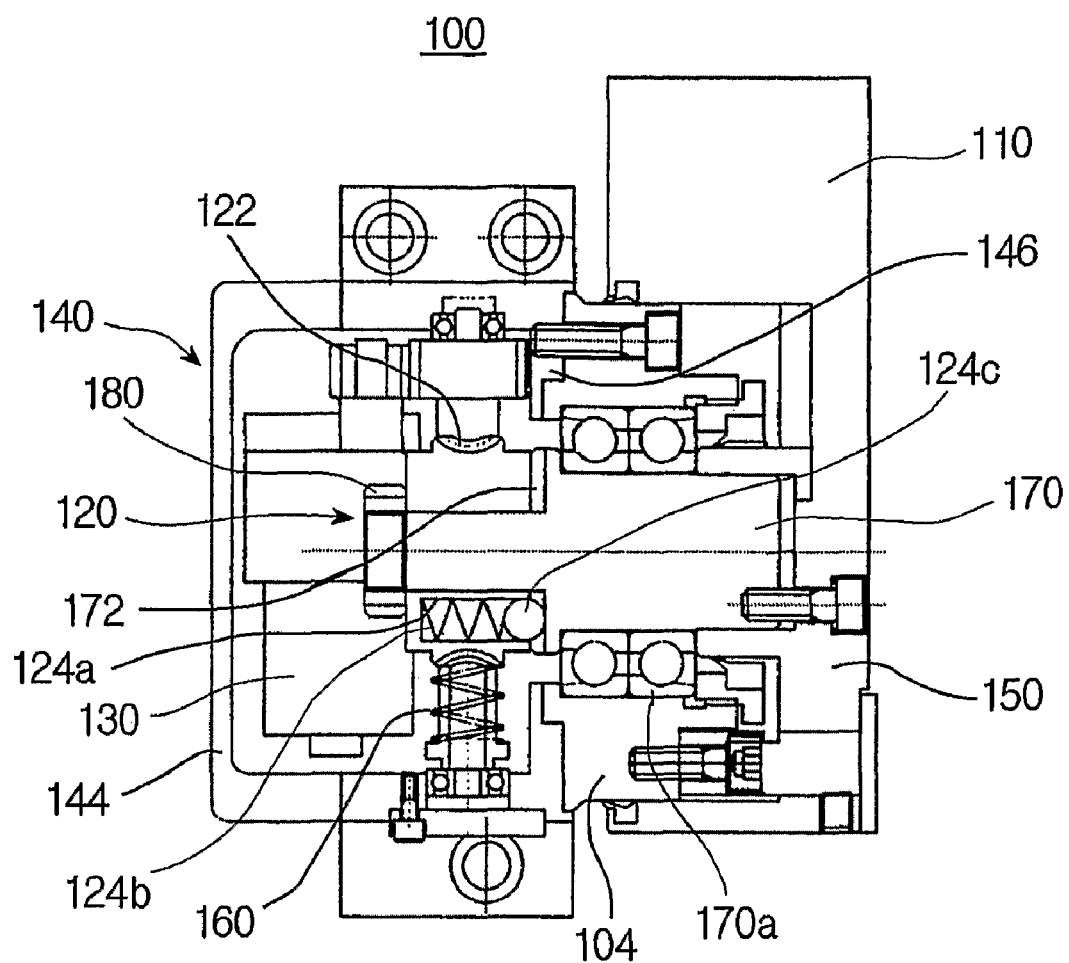
FIG. 4B is a view indicated by the arrow "B" in FIG. 3A, showing an internal constitution of the apparatus for detecting the position of the cutting tool.

FIGS. 3A and 3B diagrammatically show a partial constitution of an apparatus for detecting the position of the cutting tool mounted to the computerized numerically controlled according to the present invention. FIG. 4A is a view indicated by the arrow "A" in FIG. 3A and FIG. 4B is a view indicated by the arrow "B" in FIG. 3A, showing an internal constitution of the apparatus for detecting the position of the cutting tool, respectively.

Figure 2:
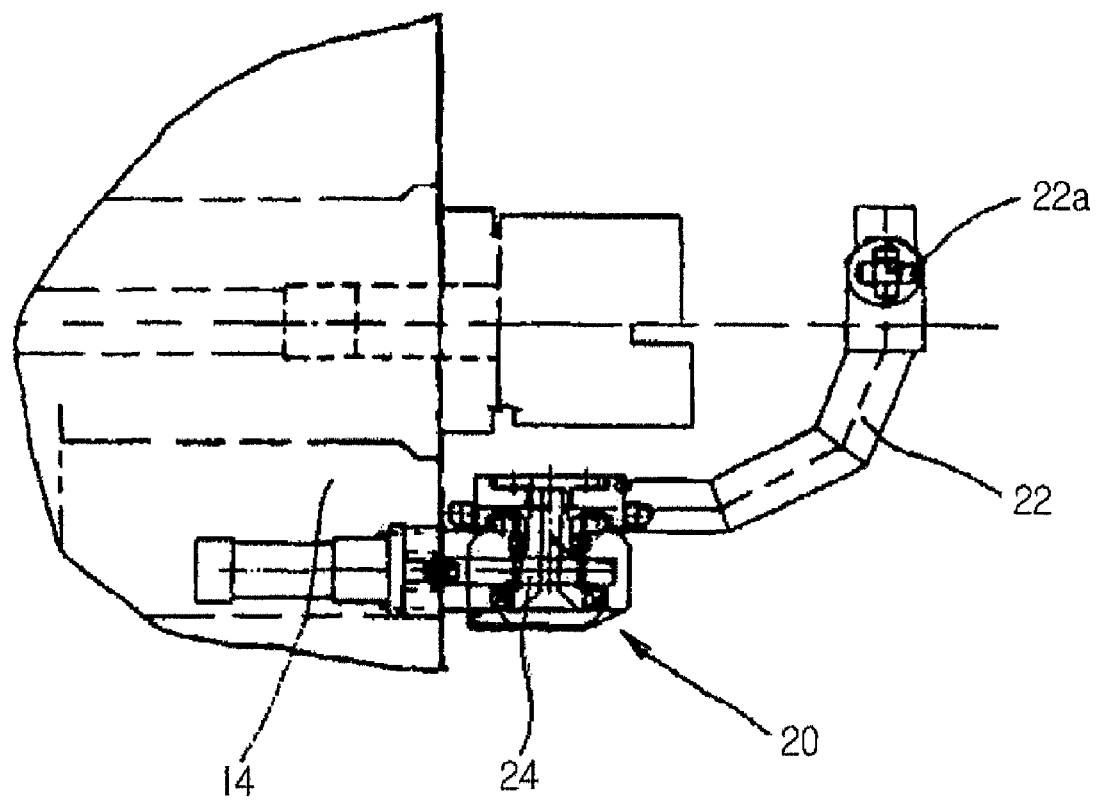
FIG. 2 shows an apparatus for detecting a position of a cutting tool mounted to the computerized numerically controlled lathe as shown in FIG. 1.

Referring to FIGS. 3A to 4B, the apparatus 100 for automatically detecting the position of the cutting tool in the computerized numerically controlled lathe according to the preferred embodiment of the present invention comprises a touch sensor 22a(referred to FIG. 2) for sensing the position of the cutting tool in the computerized numerically controlled lathe; an arm 110 for moving the touch sensor 22a to a position for sensing the position of the cutting tool; a gear assembly 120 for pivoting the arm 110 in a range of predetermined rotational angles, the gear assembly 120 being combined to the arm 110; a driving motor 130 for supplying a driving force to the gear assembly 120; and a housing 140 for accommodating the gear assembly 120 and the driving motor 130.

The housing 140 includes a main body 142 having a circular-shaped section at one distal end, a cover 144 combined to the main body 142 at one side of the main body 142, and a supporting member 146 for supporting a shaft of one gear among the gears of the gear assembly 120, the supporting member 146 being combined to the main body 142 at the other side of the main body 142.

Figure 1:
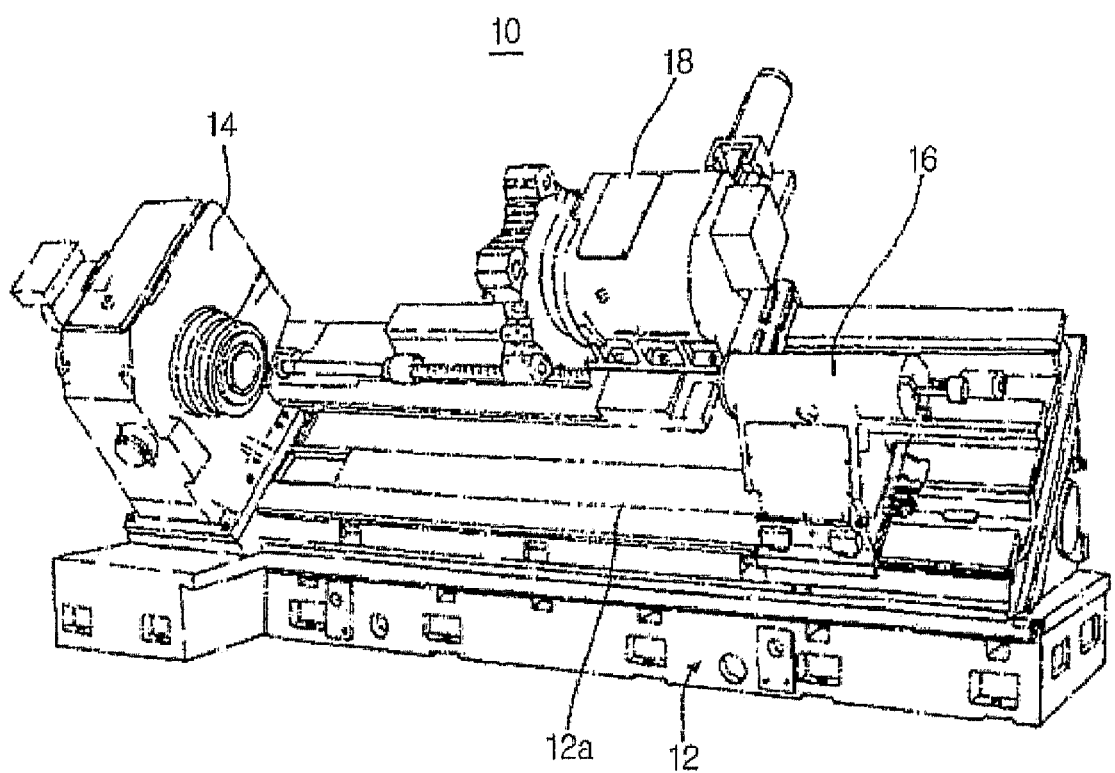
FIG. 1 is an external perspective view of a conventional computerized numerically controlled lathe.

The main body 142 of the hosing 140 is fixed to the one side of the computerized numerically controlled lathe, for example, one side of the headstock 14(referred to FIG. 1). A bearing housing 104 is fixedly mounted to the one side of the main body 142 of the hosing 140. A stopper 194 is fixedly mounted to the surface of the bearing housing 104 and extends to the outside.

A sensing dog 196 protrudes from one surface of the arm 110, which is opposite to the main body 142 of the housing 140. A camshaft 174 is fixed to the one surface of the arm 110 by means of a connecting member 150 at a predetermined position so that the camshaft 174 may be contacted with the stopper 194 at a position where the arm 110 stops to rotate.

A cover 144 of the housing 140 and the supporting member 146 are combined to both sides of the main body 142 by means of a screw, respectively.

A spur gear 132 is mounted to a distal end of the rotational shaft of the driving motor 130.

The arm 110 is fixed to the connecting member 150 by means of a screw, the connecting member 150 being connected to the other end of the shaft of the worm wheel, will be explained herein below. Accordingly, the arm 110 can rotate in the rotational direction of the shaft of the worm wheel.

The arm 110 is provided with the touch sensor 22a for sensing the position of the cutting tool at its distal end. The touch sensor 22a mounted to the distal end of the arm 110 senses the position of the cutting tool when the arm 110 rotates and then reaches at a set position where the arm 110 faces to the cutting tool. Thereafter, the touch sensor 22a provides the control part of the computerized numerically controlled lathe with a sensing signal.

The gear assembly 120 includes an idle gear 122 that is engaged with the spur gear 132 mounted to the driving motor 130; a worm wheel 124 for pivoting the arm 110 by engaging with the arm 110; a worm 126 for rotating the worm wheel 124; and a worm shaft 128 having a spur gear 128a at its one end. At this time, the worm 126 is sliderably mounted to the worm shaft 128.

The idle gear 122 for reducing the rotational speed of the driving motor 130 is disposed between the spur gear 128a mounted to the worm shaft 128 of the gear assembly 120 and the spur gear 132 mounted to the distal end of the rotational shaft of the driving motor 130.

Both ends of the worm shaft 128 are supported by bearings 128b, 128c on the inner surface of the housing 140. The spur gear 128a is mounted to the one end of the worm shaft 128 and is engaged with the idle gear 122 for receiving a rotational force from the driving motor 130 via the idle gear 122.

Figure 5:
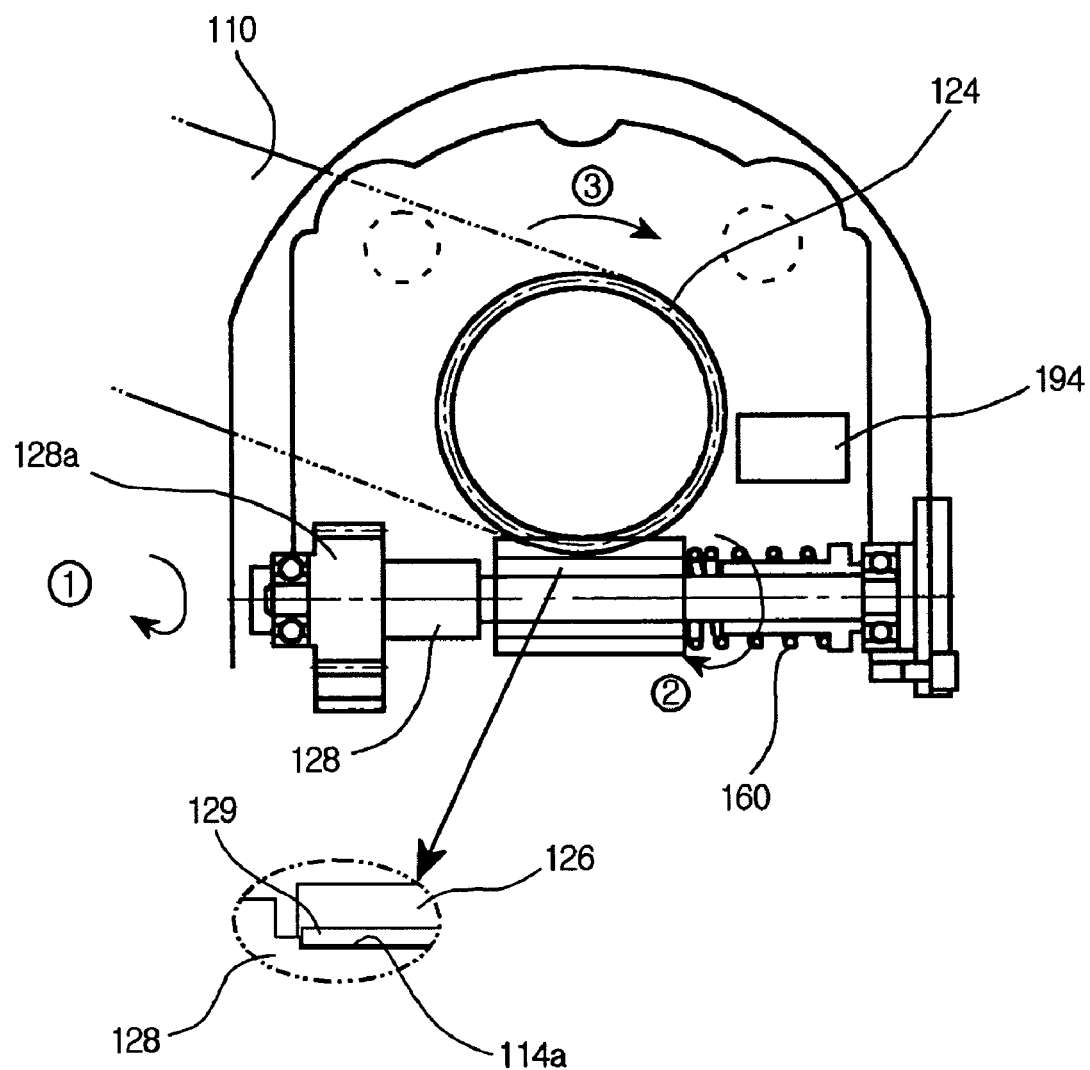
FIG. 5 shows the operational state that the arm of the apparatus for detecting the position of the cutting tool according to the preferred embodiment of the present invention is moved toward the sensing position.

FIG. 5 shows the peripheral constitution of the worm shaft in detail.

As shown in FIG. 5, a staged portion 128d is formed at a position spaced a distance from the one end of the worm shaft 128 toward the other end thereof along the axial line of the worm shaft 128. A flange 128e is formed at the other end of the worm shaft 128.

At the worm shaft 128, an elongated key groove 114a having predetermined width and depth is longitudinally formed at an outer periphery surface between the staged portion 128d and the flange 128e.

The worm 126 is mounted onto the worm shaft 128 at the other end of the worm shaft 128 and it can reciprocally slide between the staged portion 128d and the flange 128e of the worm shaft 128.

In the meantime, a key 129 for preventing the worm 126 from independently rotating with respect to the worm shaft 128 is inserted into the key groove 114a formed at the worm shaft 128.

An elastic member 160 for elastically restraining the slide movement of the worm 126 along the worm shaft 128 is disposed between the worm 126 mounted to the worm shaft 128 and the flange 128e of the worm shaft 128. Preferably, the elastic member 160 comprises a coiled spring.

Referring now to FIGS. 4A and 4B, the worm wheel 124 is mounted to one end of a worm wheel shaft 170 mounted to the supporting member 146 that is combined to the other side of the main body 142 of the housing 140. A recess 124a having a predetermined diameter is formed on the one side surface of the worm wheel 124 at a predetermined position.

An elastic member 124b having a predetermined elastic force is inserted into the recess 124a. A ball 124c is disposed at the open portion of the recess 124a so that it is elastically supported by the elastic member 124b.

A staged portion 172 is formed at a middle portion of the worm wheel shaft 170. Furthermore, a screw is formed at one end of the worm wheel shaft 170. By engaging a nut 180 with one end of the worm wheel shaft 170 after mounting the worm wheel 124 to the one end, it is possible to prevent the worm wheel 124 from independently rotating with respect to the worm wheel shaft 170.

The other end of the worm wheel shaft 170 is rotatably engaged with the supporting member 146 of the housing 140 by means of a bearing 170a. The connecting member 150 for mounting the arm 110 is forcibly fitted into the other end of the worm wheel shaft 170 as shown in FIG. 4B.

One end of the arm 110 is engaged with the connecting member 150 forcibly fitted into the other end of the worm wheel shaft 170 and it rotates together with the worm wheel shaft 170.

A first sensor 190 and a second sensor 192 are disposed in the housing 140. The first and the second sensors 190,192 are positioned in close proximity to the main body 142 of the housing and they are spaced with each other at a predetermined distance. The first and the second sensors 190,192 sense the movement of the arm 110 during the rotation of the arm 110.

The first and the second sensors 190,192 generate sensing signal relative to the position of the arm. When the arm is positioned at an initial position, the sensing dog 196 of the arm is positioned at a coaxial line to the axis line of the second sensor 192. When the arm is moved to a sensing position, the sensing dog 196 of the arm is positioned at a coaxial line to the axis line of the first sensor 190.

Hereinafter, the operation and the effect of the apparatus 100 for detecting the position of the cutting tool in the computerized numerically controlled lathe according to the preferred embodiment of the present invention will be explained in detail.

In the apparatus 100 for detecting the position of the cutting tool in the computerized numerically controlled lathe as described above, the arm 110 stops at its initial position while the tool rest moves so as to process a work piece. As is most clearly seen in FIG. 4A, the sensing dog 196 of the rotating arm 110 rotating together with the worm wheel 124 may be coaxial with the axis of the second sensor 192.

The arm 110 maintained its initial position is far away from the tool rest and the headstock such that it does not hinder cutting tool's operating during reciprocal movement of the cutting tool along the bed of the computerized numerically controlled lathe.

If a cutting tool is mounted to the tool rest, the control part judges whether the cutting tool is correctly mounted to the tool rest at its initial position or not.

Thereafter, in order to detect the position of the cutting tool, the driving motor 130 begins to be operated and rotated. Thereby, the rotational force is transmitted to the worm 126 via the spur gear 132 mounted to the rotational axis of the driving motor 130 and the idle gear 122 engaged with the spur gear 132.

Continuously, the rotational force of the driving motor 130 is transmitted to the worm wheel 124 via the worm 126 and thereby the worm wheel shaft 170 for supporting the worm wheel 124, of which the other end is mounted to the arm 110 by means of the connecting member 150, begins to be rotated.

Accordingly, the arm 110 combined to the worm wheel shaft 170 is pivoted toward the cutting tool of the computerized numerically controlled lathe.

At this time, the worm 126 and the worm wheel 124 rotate together due to the rotational force of the driving motor 130 and thereby the sensing dog 196 of the rotating arm 110 rotating together with the worm wheel 124 approaches to the first sensor 190. When the sensing dog 196 approaches to the first sensor 190, the first sensor 190 senses the movement of the arm and transmits a sensing signal to the control part of the computerized numerically controlled lathe.

The control part of the computerized numerically controlled lathe confirms that the arm has been reached at the sensing position, and makes the cutting tool of the tool rest to move toward the touch sensor 22a.

FIG. 5 shows the operational state that the arm of the apparatus for detecting the position of the cutting tool according to the preferred embodiment of the present invention is moved toward the sensing position.

As shown in FIG. 5, if the worm shaft 128 is rotated in a predetermined direction, for example, in the direction indicated by the arrow "①", the worm 126 is rotated in the direction indicated by the arrow "②". At this time, the worm wheel 124 engaged with the worm 126 is rotated in the direction indicated by the arrow "③" until the camshaft 174 reaches at the stopper 194.

If the rotating arm 110 is rotated in the direction indicated by the arrow "③", the protruding end of the camshaft 174 fixed to the rotating arm 110 is brought into contact with one sectional surface of the stopper 194 and thereby it stops at a preset sensing position. When the camshaft 174 reaches at the stopper 194, the tool rest is moved toward the position adjacent to the touch sensor 22a in accordance with the program that is preprogramedly input into the computerized numerically controlled lathe 10 and thereby the front distal end of the cutting tool begins to be contacted with the touch sensor 22a.

At this time, the touch sensor 22a provides the control part with a sensing signal. As described above, the control part judges whether the rotating arm 110 reaches at the sensing position or not after judging whether the sensing dog 196 approaches to the first sensor 190 or not.

Figure 6:
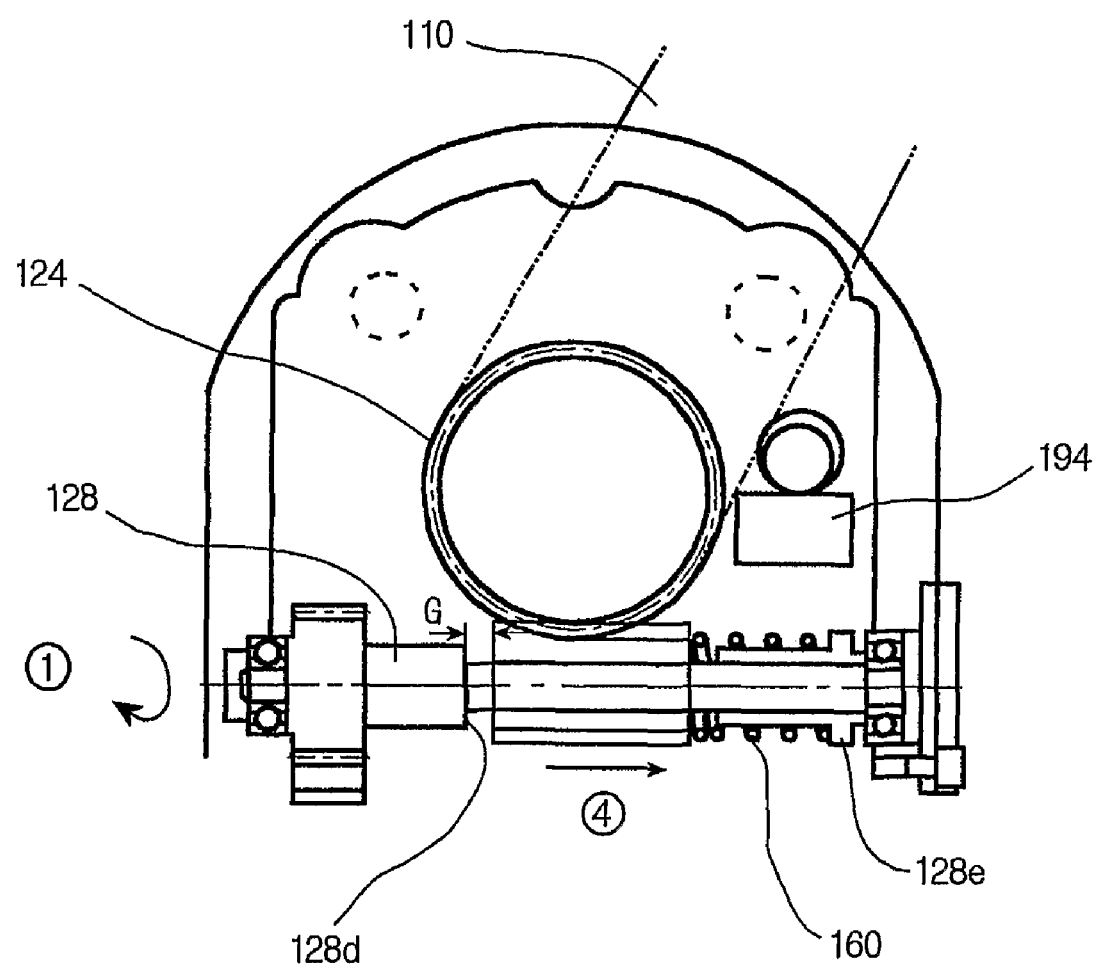
FIG. 6 shows the operational state that the worm of the apparatus for detecting the position of the cutting tool according to the preferred embodiment of the present invention is moved in the axial direction.

FIG. 6 shows the operational state that the worm of the apparatus for detecting the position of the cutting tool according to the preferred embodiment of the present invention is moved in the axial direction.

Referring to FIG. 6, when the camshaft 174 reaches at the stopper 194, the worm wheel 124 cannot be further rotated and stops rotating. Under this state, if the driving motor 130 operates for a predetermined time, for example, about 0.5 sec, the worm shaft 128 is continuously rotated in the direction indicated by the arrow "①". At this time, the worm 126 engaged with the worm wheel 124 begins to be rotated and moved in the direction indicated by the arrow "④". As a result, the other end of the worm 126 is spaced from the staged portion 128d of the worm shaft 128 at a predetermined gap(G) and the elastic member 160 may be compressed corresponding thereto.

Figure 7:
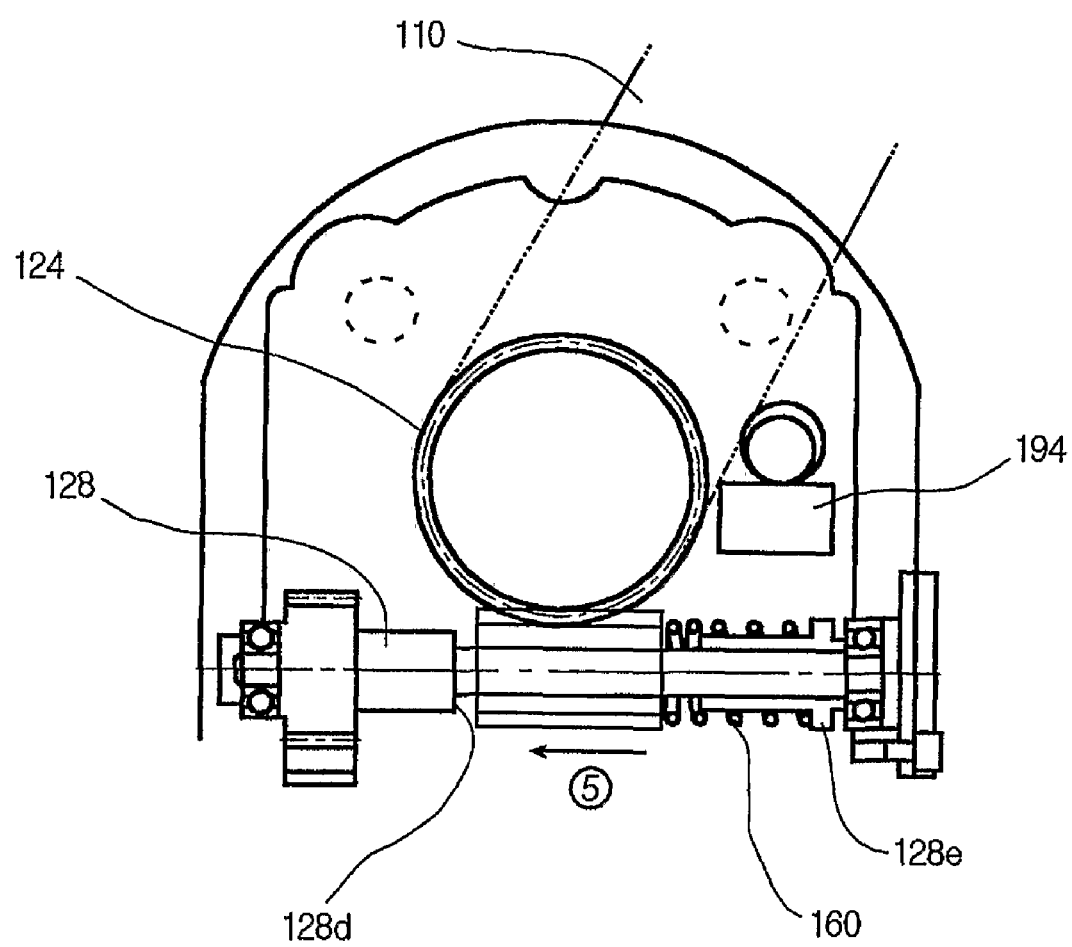
FIG. 7 shows the operational state that the worm of the apparatus for detecting the position of the cutting tool according to the preferred embodiment of the present invention retreats in the backward direction.

FIG. 7 shows the operational state that the worm of the apparatus for detecting the position of the cutting tool according to the preferred embodiment of the present invention retreats in the backward direction.

As shown in FIG. 7, when the driving motor 130 stops operating, the elastic force of the elastic member 160 begins to be applied to the worm 126 in the direction indicated by the arrow "⑤". At this time, a force is applied to the worm wheel 124 engaged with the worm 126 in the clockwise direction. As a result, the rotating arm 110 is continuously positioned at the sensing position while the driving motor 130 stops operating.

Under this state, when the tool rest is moved and then it is brought into contact with the touch sensor 22a, the touch sensor 22a generates a sensing signal. Thereafter, the driving motor 130 operates in the reverse direction in order to make the rotating arm 110 to return its initial position.

Figure 8:
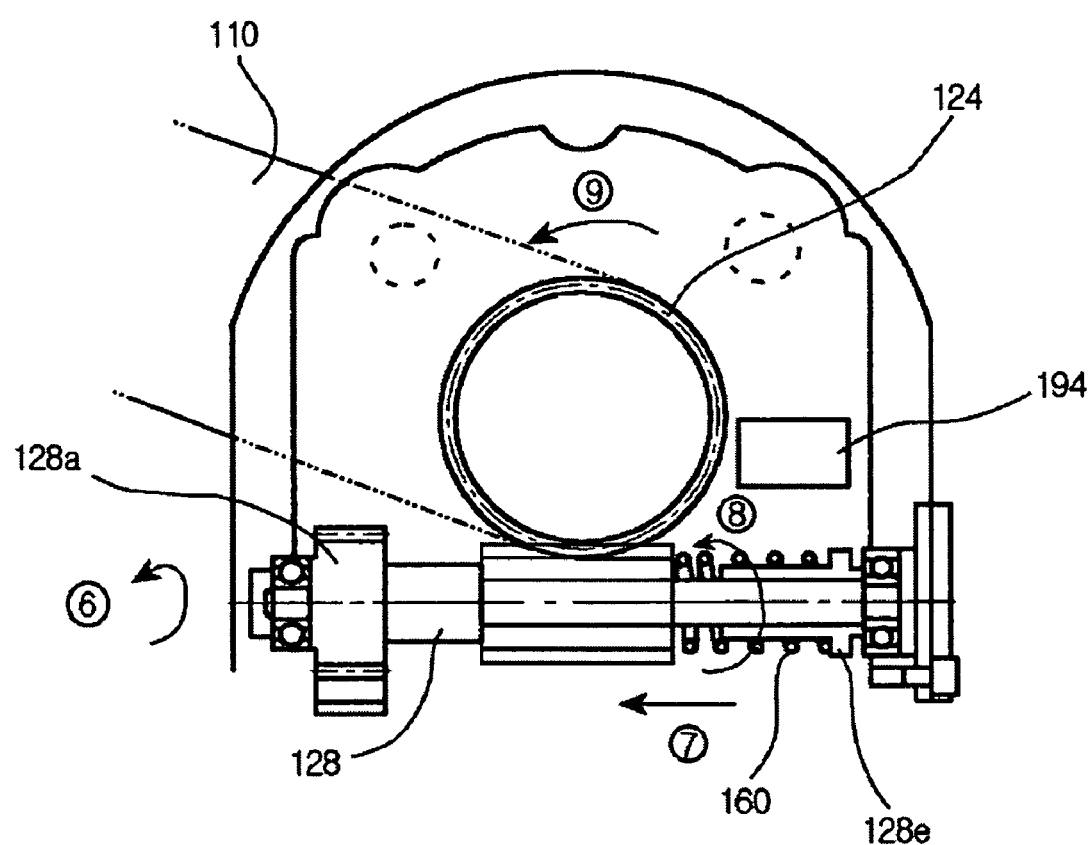
FIG. 8 shows the operational state that the arm of the apparatus for detecting the position of the cutting tool according to the preferred embodiment of the present invention returns to its initial position.

FIG. 8 shows the operational state that the arm of the apparatus for detecting the position of the cutting tool according to the preferred embodiment of the present invention returns to its initial position.

When the driving motor 130 operates in the reverse direction, the shaft 128 is rotated in the direction indicated by the arrow "⑥". At this time, the worm 126 performs a rotational motion in the direction indicated by the arrow "⑧" and a straight-line motion in the direction indicated by the arrow "⑦" due to the rotational force of the shaft 128 and the elastic force of the elastic member 160. The worm wheel 124 engaged with the worm 126 is rotated in the direction indicated by the arrow "⑨" until the touch sensor 22a of the rotating arm 110 reaches at the initial position corresponding to an initial ready state of the rotating arm. Thereafter, the work piece may be precisely machined by means of the cutting tool, of which position is precisely corrected.

INDUSTRIAL APPLICABILITY

As described above, in the apparatus for automatically detecting the position of the cutting tool in the computerized numerically controlled lathe according to the present invention, it is possible to prevent over-load operation of a driving motor by allowing an arm to be safely stop at a position of detecting the cutting tool while the driving motor stops operating. Thereby, the durability of the apparatus for automatically detecting the position of the cutting tool can be highly enhanced.

While the present invention has been particularly shown and described with reference to particular embodiments thereof, it will be understood by those skilled in the art that various changes in form and details may be effected therein without departing from the spirit and scope of the invention as defined by the appended claims.

The invention claimed is:

1. An apparatus for automatically detecting a position of a cutting tool in a computerized numerically controlled lathe, the apparatus comprising:
   a touch sensor for sensing the position of the cutting tool in the computerized numerically controlled lathe;
   an arm for moving the touch sensor to a predetermined position for sensing the position of the cutting tool, the arm being provided with a sensing dog, which protrudes from one side surface of the arm at a predetermined length;
   a gear assembly for pivoting the arm in a range of predetermined rotational angles, the gear assembly being combined to the arm;
   a driving motor for supplying the gear assembly with a driving force; and
   a housing for accommodating the gear assembly and the driving motor, in which a bearing housing is fixedly mounted to one side of a main body of the housing, a stopper is fixedly mounted to an exposed surface of the bearing housing for restraining pivoting and defining a predetermined sensing position of the arm, and first and second sensors are installed at one surface of the housing for sensing, by means of said sensing dog, the access state of the arm during rotation of the arm.

2. The apparatus for automatically detecting the position of the cutting tool in the computerized numerically controlled lathe according to claim 1, wherein the gear assembly includes an idle gear that is engaged with a spur gear mounted to the driving motor, a worm wheel for pivoting the arm by engaging with the arm, a worm for rotating the worm wheel, and a worm shaft having a spur gear at its one end, in which the worm is slidably mounted to the worm shaft.

3. The apparatus for automatically detecting the position of the cutting tool in the computerized numerically controlled lathe according to claim 2, wherein the worm shaft is provided with a staged portion, which is formed at a position spaced from the one end of the worm shaft toward the other end thereof at a predetermined distance, in which a flange is formed at the other end of the worm shaft.

4. The apparatus for automatically detecting the position of the cutting tool in the computerized numerically controlled lathe according to claim 2, wherein the touch sensor is mounted to a distal end of the arm, a camshaft is fixedly installed at a radial outer circumferential surface of the arm.

5. The apparatus for automatically detecting the position of the cutting tool in the computerized numerically controlled lathe according to claim 4, wherein the main body of the housing is fixed to one side of the headstock of the computerized numerically controlled lathe, the worm and the worm wheel engaged with the worm are rotated together until the camshaft of the arm is contacted with the stopper and the arm reaches said predetermined sensing position, when the arm rotates and thereby it reaches the predetermined sensing position, the cutting tool begins to be moved on a basis of the pre-programmed process condition and then it is contacted with the touch sensor, whereby the touch sensor generates a sensing signal and then it supplies the control part of the computerized numerically controlled lathe with the sensing signal.

6. An apparatus for automatically detecting a position of a cutting tool in a computerized numerically controlled lathe, the apparatus comprising:
   a touch sensor for sensing the position of the cutting tool in the computerized numerically controlled lathe;
   an arm for moving the touch sensor to a predetermined position for sensing the position of the cutting tool, the arm being provided with a sensing dog, which protrudes from one side surface of the arm at a predetermined length;
   a gear assembly for pivoting the arm in a range of predetermined rotational angles, including an idle gear, a worm wheel for pivoting the arm by engaging with the arm, a worm for rotating the worm wheel, and a worm shaft having a spur gear at its one end, in which the worm is slidably mounted to the worm shaft;
   a driving motor for supplying the gear assembly with a driving force through a spur gear mounted to said driving motor and engaged with said idle gear; and
   a housing for accommodating the gear assembly and the driving motor, in which a bearing housing is fixedly mounted to one side of a main body of the housing, a stopper is fixedly mounted to an exposed surface of the bearing housing for restraining pivoting and defining a predetermined sensing position of the arm, and first and second sensors are installed at one surface of the housing for sensing, by means of said sensing dog, the access state of the arm during rotation of the arm
   wherein the worm shaft is provided with a staged portion, which is formed at a position spaced from the one end of the worm shaft toward the other end thereof at a predetermined distance, and a flange is formed at the other end of the worm shaft, the worm being slidably mounted between the staged portion and the flange of the worm shaft, and an elastic member for elastically supporting the worm being disposed between the worm and the flange of the worm shaft so as to restrain the slide movement of the worm.

7. An apparatus for automatically detecting a position of a cutting tool in a computerized numerically controlled lathe, the apparatus comprising:
   a touch sensor for sensing the position of the cutting tool in the computerized numerically controlled lathe;
   an arm for moving the touch sensor to a predetermined position for sensing the position of the cutting tool, the arm being provided with a sensing dog, which protrudes form one side surface of the arm at a predetermined length;
   a gear assembly for pivoting the arm in a range of predetermined rotational angles, including a worm wheel for pivoting the arm by engaging with the arm, a worm for rotating the worm wheel, and a worm shaft, in which the worm is slidably mounted to the worm shaft;
   a driving motor for supplying the worm shaft with a driving force; and
   a housing for accommodating the gear assembly and the driving motor, in which a stopper is fixedly coupled to the housing for restraining pivoting of the arm and defining a predetermined sensing position of the arm, and first and second sensors are installed at one surface of the housing for sensing, by means of said sensing dog, the access state of the arm during rotation of the arm,
   wherein a flange is formed at an end of the worm shaft, and an elastic member for elastically supporting the worm is disposed between the worm and the flange of the worm shaft so as to restrain the slide movement of the worm.

* * * * *